United States Patent [19]
Romanow

[11] Patent Number: 5,771,600
[45] Date of Patent: Jun. 30, 1998

[54] COFFEE-BEAN ROASTING ATTACHMENT FOR A ROTISSERIE

[76] Inventor: James D. Romanow, 3211 Wayne St., Endwell, N.Y. 13760

[21] Appl. No.: 656,511

[22] Filed: May 31, 1996

[51] Int. Cl.⁶ .................................................. F26B 19/00
[52] U.S. Cl. ............................................ 34/63; 99/421 H
[58] Field of Search ................................. 34/61, 68, 547, 34/63, 95, 109, 126, 132, 603, 602, 166; 99/421 H, 286, 323.5

[56] References Cited

U.S. PATENT DOCUMENTS

| | | | |
|---|---|---|---|
| 1,747,239 | 2/1930 | Hauck | 34/126 |
| 2,101,417 | 12/1937 | Wladvogel | 34/63 |
| 2,705,450 | 4/1955 | Steinbook | 99/421 H |
| 3,103,161 | 9/1963 | Whitehead | 99/421 H |
| 4,061,083 | 12/1977 | Caliva | 99/421 H |
| 5,417,148 | 5/1995 | Cavallo | 99/427 |

OTHER PUBLICATIONS

Coffee Journal, Spring 1996, p. 38.

*Primary Examiner*—John M. Sollecito
*Assistant Examiner*—Steve Gravini
*Attorney, Agent, or Firm*—Salzman & Levy

[57] ABSTRACT

The present invention features a kit or an attachment apparatus for roasting a small quantity of green coffee beans upon a rotisserie unit. The kit or apparatus is rotationally mounted to an oven or a grill. The kit contains a perforated, cylindrical, hollow drum that has at least one internal fin for stirring the tumbling coffee beans within the hollow drum, as it is caused to rotate. The drum is attachable to a spit of the rotisserie, which is, in turn, attachable to a drive motor. The drive motor and the distal end of the spit are each mounted by attachment brackets to respective, end walls of the oven or grill. The cylinder can receive the green coffee beans through the removal of an end lid of the drum, or through a hatch door located in a mid-portion of the cylindrical drum. A layer of insulation is wrapped about one portion of the spit, and acts as a handle for removing the heated drum of roasted beans from the oven or grill. The spit is generally made of a square shaft of metal, which can be fabricated as a telescoping shaft or a set of nested shafts, so that the drum can be mounted in a wide variety of large- or small-sized ovens and grills. The kit can also be provided with a set of differently-sized drums for roasting different amounts of beans, or with a single, specifically-sized drum that fits a particular oven or grill.

6 Claims, 3 Drawing Sheets

COFFEE-BEAN ROASTING ATTACHMENT FOR A ROTISSERIE

FIELD OF THE INVENTION

The present invention pertains to the art of home-brewing specialty coffees and, more particularly, to a roasting attachment for a home- or small, coffee-shop, industrial-rotisserie that will roast green coffee beans, so that coffee brewed from freshly roasted coffee beans can be enjoyed.

BACKGROUND OF THE INVENTION

Home-brewing specialty coffees is quite popular nowadays across the country. It is not uncommon to find espresso and other specialty coffee-brewing machines in the homes of average Americans. Along with these machines, the coffee-brewing-machine industry has also spawned sales of accessories, such as coffee grinders for grinding coffee beans at home; special, gold foil filters for eliminating acid residues from paper during the filtering process; and special, coffee-serving decanters to lock in the fresh taste and coffee aroma while the coffee is awaiting service, etc.

The fascination with coffee-brewing has reached all levels of expense and interest. Coffee shops now sell coffee beans from all over the world, including special house blends and specially flavored beans.

Do-it-yourself home brewers and aficionados crave the freshest coffee taste and flavors. Home-grinding and -brewing of special blends provides enhanced coffee flavor, but the average consumer has no control over the freshness of the beans he or she may purchase in coffee shops. While it is true that home-grinding will enhance the flavor of old beans, if they have not been freshly roasted to begin with, much of the brewed flavor is thus lost. There is enough time between roasting at a coffee emporium, selling to the customer, and brewing at home, that the bean loses flavor. Before the beans will be completely consumed they are often, if not usually, stale.

Since consumers presently have no control over the coffee-bean roasting process, coffee aficionados are losing much of the freshness and flavor that they desire by this inability to roast coffee beans at home, according to their own taste. Roasting can be controlled by both length of time of roasting and the temperature (within a particular range) at which the beans are roasted; by offering the consumer complete control over these variables they will have the opportunity to optimize the flavor of the beans according to their preferences for dark roast, low-acid coffee, or a light roast, tangy cup.

It would be desirable, then, for a coffee devotee to be able to buy green coffee beans and roast small quantities thereof at home, just prior to brewing coffee.

It would also be desirable for a coffee enthusiast to roast green coffee beans to his or her own special tastes, using temperatures and roasting times suitable thereto.

For the aforementioned reasons, among others, it would be advantageous to provide a mechanism to allow industrial coffee shops, restaurants and supermarkets to roast coffee beans on the premises, shortly prior to sale. It is an object of this invention, therefore, to provide a simple means by which coffee beans can be roasted at home or in small, commercial settings.

The present invention features a simple kit or an attachment apparatus for home rotisseries that will allow a consumer or a small shopkeeper to roast a small quantity of green coffee beans. The kit for the rotisserie machines comprises a small, perforated, roasting drum that is shaped like a cylinder. It receives green coffee beans through a centrally-disposed hatch or through a removable end lid. The drum attaches to the rotisserie spit, which is driven by the rotisserie motor. The roasting drum has at least one internal fin for stirring the tumbling beans, as the drum turns on the spit. The kit can be used in grills and ovens that are open-flame, gas, and electric. The kit contains a mounting bracket for rotationally mounting a distal end of the spit to an end wall of the oven or grill. Another mounting bracket is provided for affixing the drive motor to an opposite wall of the grill or oven.

SUMMARY OF THE INVENTION

In accordance with the present invention, there is provided for roasting a small quantity of green coffee beans upon a rotisserie unit a kit or an attachment apparatus that is rotationally mounted to an oven or a grill. The kit contains a perforated, hollow, cylindrical drum that has at least one internal fin for stirring the tumbling coffee beans within the hollow drum, as it is caused to rotate. The drum is attachable to a spit of the rotisserie, which is, in turn, attachable to a drive motor. The drive motor and the distal end of the spit are each mounted by attachment brackets to respective, end walls of the oven or grill. The drum can receive the green coffee beans through the removal of an end lid, or through a hatch-door disposed in a mid-portion of the cylindrical drum. A layer of insulation is wrapped about one portion of the spit, and acts as a handle for removing the heated drum of roasted beans from the oven or grill. The spit generally comprises a square shaft of metal, which can be fabricated as a telescoping shaft or a set of nested shafts, so that the drum can be mounted in a wide variety of large- or small-sized ovens and grills. Likewise, the kit can be provided with a set of differently-sized drums for roasting different amounts of beans, or with a single, specifically-sized drum that fits a particular oven or grill. Also, the kit can be provided with a multiple shaft assembly as required by larger area heat sources.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same numerical designations throughout the FIGURES.

DESCRIPTION OF THE PREFERRED EMBODIMENT

Generally speaking, the invention features a kit for converting a home oven or grill into a roaster for roasting coffee beans. The kit contains a rotisserie-mounted, hollow, perforated drum for receiving green coffee beans for roasting. A motor rotationally drives the drum by a shaft that rotationally mounts to a side wall of the oven or grill, and passes through the drum. Brackets are provided for mounting the motor and the shaft to the respective side walls of the oven or grill.

Figure 1:
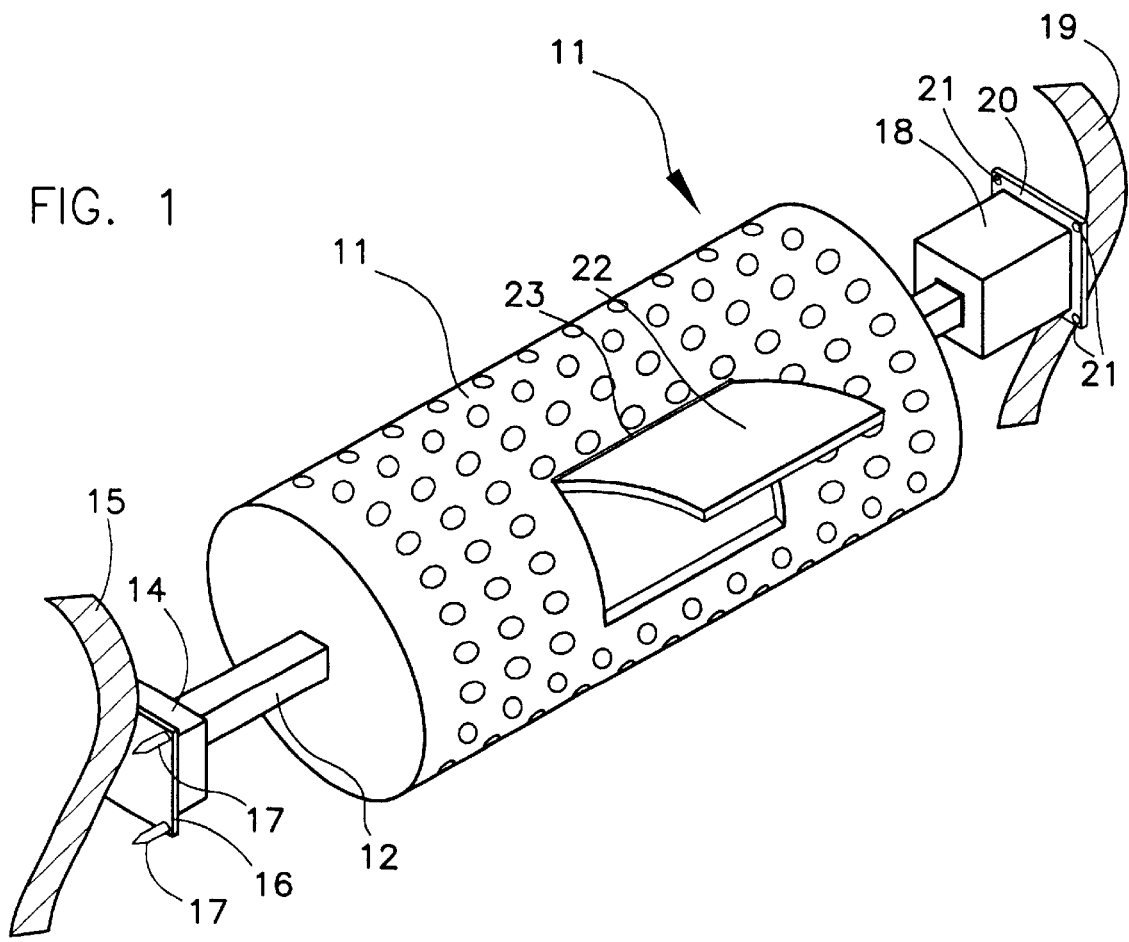
FIG. 1 illustrates a perspective, in situ view of an assembled kit apparatus for roasting coffee beans, in accordance with this invention.

Now referring to FIG. 1, the roasting apparatus 10 of this invention is shown. The roasting apparatus 10 comprises a hollow, perforated drum 11 that is fixedly mounted to a square shaft 12 which passes through the hollow, perforated drum 11, as illustrated. It has been found that a perforated drum provides three major improvements to the operator of the roaster. First, the perforations allow the operator the opportunity to observe the state of the beans during the roasting process. This allows for complete control of the roasting process without having to open the roaster and remove a sample for inspection. Second, the perforations allow for quick warm up and even heating of the roaster's contents, providing greater efficiency and more even roasting of the beans. Surprisingly, perforations facilitate even roasting due to the fact that a perforated drum does not retain heat, as does a solid drum. That is, in a solid drum, an objectionable heat differential between metal and air occurs, resulting in the likelihood of unevenly roasted beans. Third, by using a perforation diameter as large as possible without having the possibility of beans escaping during the roasting process, and by using material of a medium gauge (e.g., gauge 14) material, the edges of the perforations serve to break up a by-product of the roasting process (the chaff) and eliminate said chaff from the newly-roasted beans, into the roasting heat source. This Last benefit eliminates the standard second step of the roasting process: chaff elimination by stirring the newly-roasted beans and blowing air across the beans. The square shaft 12 is rotationally mounted between a ball-bearing race 14 that is bracket-mounted to the left-hand side of an oven or grill wall 15 (by means of bracket 16 and screws 17), and drive motor 18 that is mounted to the right-hand side of the oven or grill wall 19 (via the bracket 20 and mounting screws 21).

The drum 11 has a hatch door 22, in the commercial version, that is supported by a hinge 23. The hatch door 22 is swung open about the hinge 23, in order to load and unload the hollow drum 11 with coffee beans to be roasted. The hatch door 22 may be substantially larger, with respect to drum 11, than shown in the FIGURE.

Figure 2:
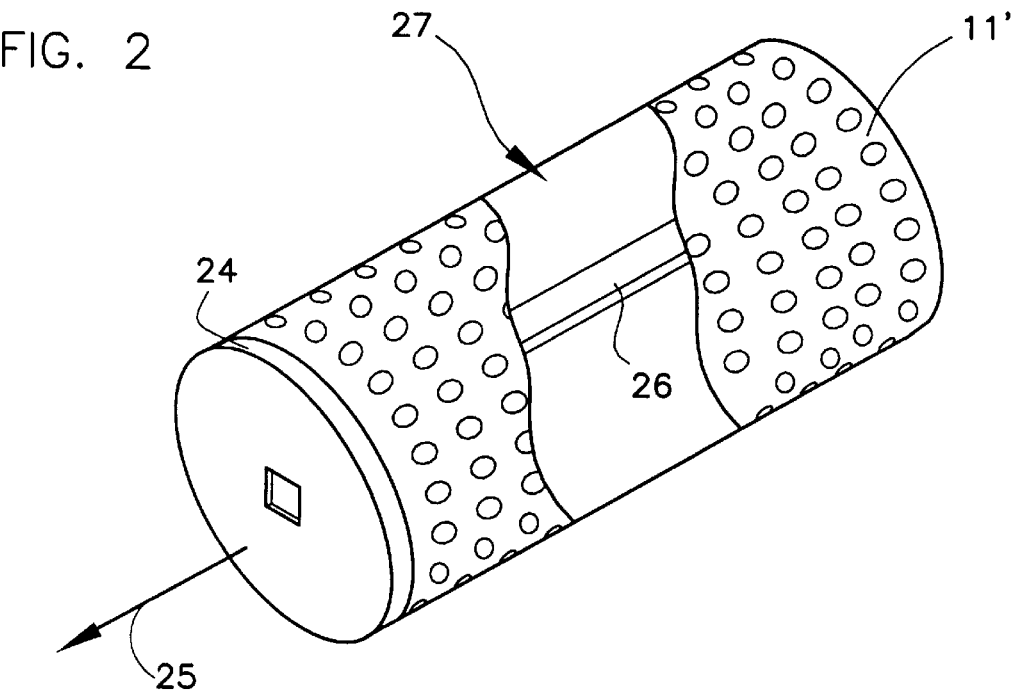
FIG. 2 depicts a perspective, cut-away view of an alternate embodiment of the roasting drum illustrated in FIG. 1.

Referring to FIG. 2, an alternate embodiment of the drum 11 of FIG. 1 is shown as drum 11'. The drum 11' has friction-fitting end lid 24, in place of hatch door 22, in this consumer (i.e., non-commercial) version. The drum 11' is loaded and unloaded with coffee beans by removing the end lid 24, which slides off the end of the drum 11', as shown by arrow 25. The cut-away mid-portion of drum 11' reveals a fin 26 that is flange-mounted within the internal wall 27 of the drum 11'. The purpose of the fin 26 is to stir the beans within the drum 11', as they are caused to tumble therein, while the drum 11' rotates.

Figure 3:
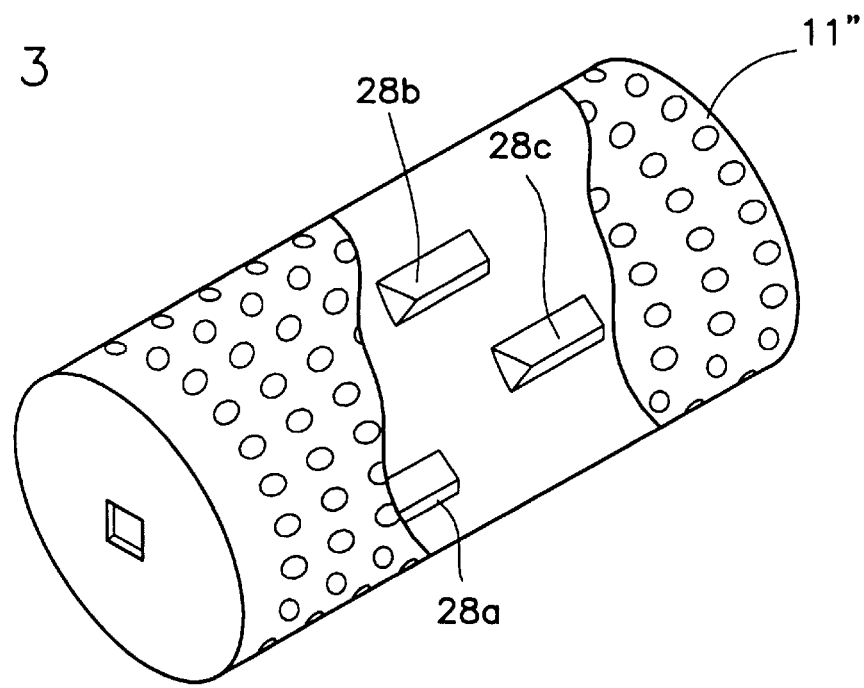
FIG. 3 shows a perspective, cut-away view of still another embodiment of the roasting drum illustrated in FIG. 1.

Referring to FIG. 3, a second, alternate embodiment of the respective drums 11 and 11' is illustrated. The drum 11" of this embodiment features a multiplicity of staggered fins 28a, 28b, 28c, etc. The staggered fins 28a, 28b and 28c, respectively, provide a different mixing or stirring pattern than the straight, drum-long fin 26 that is disposed in drum 11'. The fins are constructed of at least 14-gauge stainless steel, aluminum, copper or any other suitable heat-conducting material; they are fixed to the wall of the cylindrical drums. This serves to encourage even distribution of the beans throughout the cylinder during the roasting process.

Figure 4:
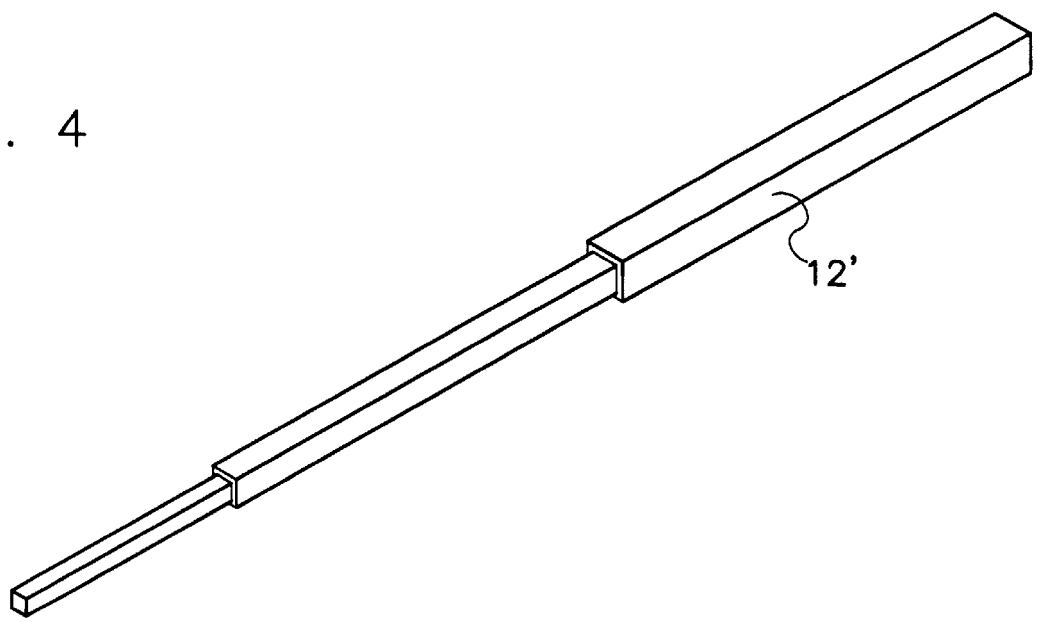
FIG. 4 depicts a front view of an alternate embodiment of the mounting shaft for the roasting drum shown in FIG. 1.

Referring to FIG. 4, a telescoping shaft 12' is illustrated. The telescoping shaft 12' allows the drums 11, 11' and 11" to be respectively mounted within differently-sized ovens or grills.

The shafts 12 and 12' are square in cross-section and made of metal. One end of the shaft is adapted to be operatively connected to the motor 18, while the other end has a handle (not shown) that is suitable for removing and handling the entire shaft and roasting drum cylinder. The handle should be made of plastic or some other insulative material that is capable of withstanding (but not conducting) heat in the range of 800° F. The dimensions of the shaft are dependent upon the type of heat source that will be used. A barbecue roaster, for instance, would have a shaft that is five-sixteenths-of-an-inch square in section and at least thirty-six inches long, so as to adapt to as many models of barbecues as possible.

The wall of the cylinder is made of perforated stainless steel or aluminum, or some other metal that conducts heat efficiently. The perforations may be no more than one-tenth of an inch in diameter; they should be patterned in a staggered fashion, in order to maximize the number of perforations in any given area. One end of the roasting drum is made of at least 14-gauge solid metal. In the center of each end of the drum is a square hole 29, which matches the shaft illustrated in FIGS. 1 through 3. The dimensions of the drum are, again, variable, according to the heat source; they may range from an 8"×4" o.d. for a small, home unit to as much as 18"×8" o.d. for a roaster used in a coffee shop or other commercial establishment.

Figure 5:
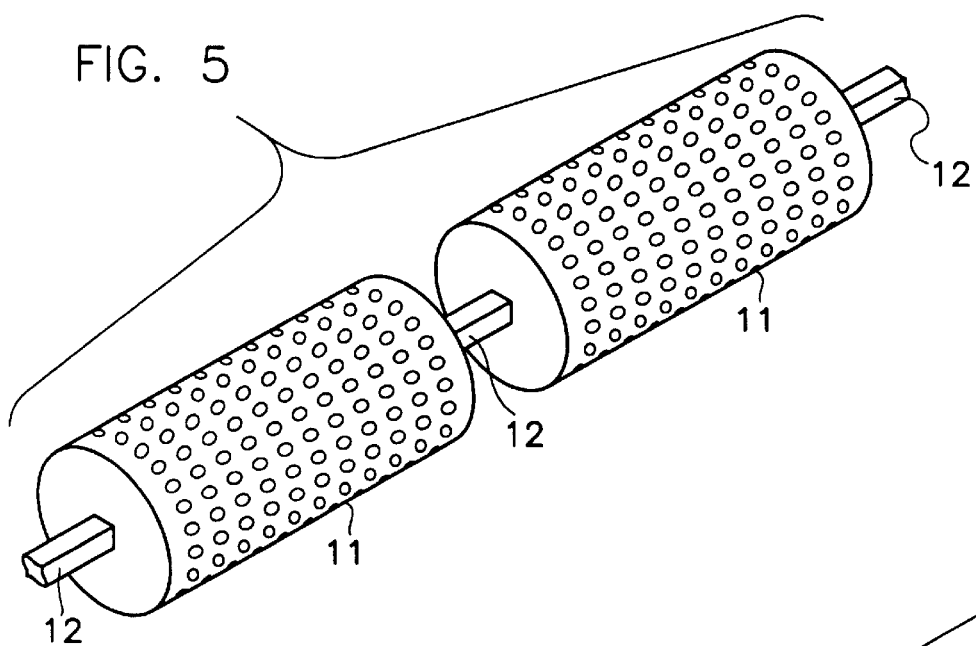
FIG. 5 depicts a perspective, in situ view of an alternate embodiment of the invention, showing two roasting drums disposed on a common shaft.

Referring now to FIG. 5, there is shown an alternate embodiment of the coffee-bean roasting device of the present invention. Two drums 11 are mounted in tandem to a common shaft 12, in a manner similar to that described with respect to FIG. 1. The advantage of providing a plurality of drums in this manner is that different varieties of beans may be roasted simultaneously, but kept separate from each other. Moreover, obviously a greater number of beans may be prepared in each roasting cycle. Finally, two or more drums 11 mounted on a single shaft 12 can result in an advantageous process, since a given quantity of beans can be divided among separate drums, thereby achieving the same results in less time.

Figure 6:
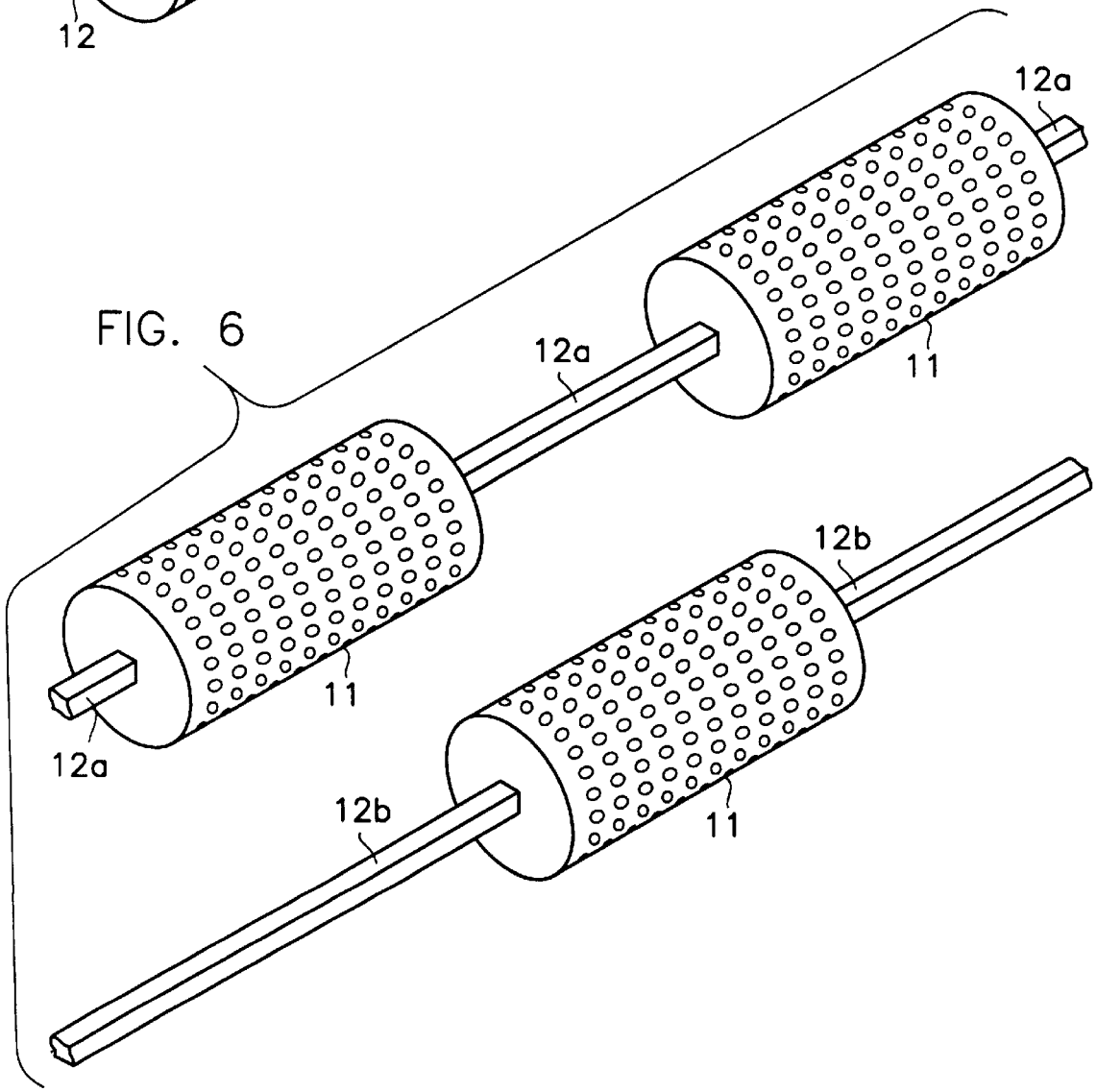
FIG. 6 depicts a plan view of a plurality of drums mounted on two shafts.

Similarly, referring now to FIG. 6, it can be seen that a plurality of drums 11 can be disposed on a number of substantially parallel shafts 12a and 12b to provide yet another advantageous configuration of the inventive apparatus. It should be understood that any reasonable number of drums 11 may be mounted on a single shaft 12, and that any number of shafts 12a, 12b, etc. may be provided, depending on the user's space availability.

Operation of the Roasting Apparatus

The cylinder is filled with green coffee beans to a maximum of approximately one-quarter of its volume, or to a maximum of the height of the internal fin, when the roaster is positioned for use. The lid is fitted. The shaft is then threaded through the square holes. The entire assembly is then placed over the heat source, and the motor is started. The assembly remains over the heat until the beans are deemed sufficiently roasted. The heat is then extinguished, and the roasting cylinder is left in place with the motor still rotating, until the cylinder is cool to the touch or longer. This second step allows for the elimination of the by-product of coffee roasting (the chaff) through the perforations of the roasting cylinder, thus effectively eliminating the need for a second machine or subsequent steps.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention. Having thus described the invention, what is desired to be protected by Letters Patent is presented in the subsequently appended claims.

What is claimed is:

1. An apparatus comprising:

a kit for converting an existing home oven or grill to a coffee-bean roasting apparatus, said kit including components for mounting to inner walls of an existing home oven or grill;

a hollow, perforated drum having a closable, loading aperture for loading coffee beans into said hollow, perforated drum and mounting means for mounting said hollow, perforated drum to a rotatable shaft;

a rotatable shaft for mounting said hollow, perforated drum to a drive motor, and for rotatably mounting to a wall of said existing oven or grill wherein said rotatable shaft comprises a telescoping-shaft configuration thereby defining means for adapting said rotatable shaft to a plurality of sizes of said existing oven or grill;

at least one fin mounted within said hollow, perforated drum for stirring said coffee beans in said hollow, perforated drum as said hollow, perforated drum is caused to rotate; a drive motor having means for connecting said drive motor to said rotatable shaft for rotating said hollow, perforated drum via said rotatable shaft; and at least one mounting bracket for mounting said drive motor and said rotatable shaft to a wall of said existing oven or grill.

2. The kit in accordance with claim 1, wherein said hollow, perforated drum further comprises a hatch door that covers said loading aperture.

3. The kit in accordance with claim 1, wherein said hollow, perforated drum further comprises a removable, end lid that covers said loading aperture.

4. The kit in accordance with claim 1, wherein said hollow, perforated drum comprises a cylindrical shape.

5. The kit in accordance with claim 1, wherein said at least one fin comprises a plurality of staggered fins internally fixed to said hollow, perforated drum on an inner wall thereof.

6. The kit in accordance with claim 1, wherein said rotatable shaft comprises a substantially square cross-section.

* * * * *